United States Patent [19]

Gulyas et al.

[11] 3,771,657
[45] Nov. 13, 1973

[54] APPARATUS FOR CONTACT BETWEEN FLUIDS

[75] Inventors: James W. Gulyas; Charles Vydra, both of Fort Saskatchewan, Alberta, Canada

[73] Assignee: Sherritt Gordon Nunes Limited, Toronto, Ontario, Canada

[22] Filed: Feb. 18, 1972

[21] Appl. No.: 227,458

[30] Foreign Application Priority Data
Mar. 29, 1971 Canada.............................. 108,904

[52] U.S. Cl...................... 210/218, 23/283, 55/179, 261/94, 423/419
[51] Int. Cl............................................. C02b 1/20
[58] Field of Search..................... 210/42, 218, 283; 261/94; 23/283; 55/179

[56] References Cited
UNITED STATES PATENTS
3,122,594  2/1964  Kielback.............................. 261/94

*Primary Examiner*—Michael Rogers
*Attorney*—Arne I. Fors et al.

[57] ABSTRACT

Precipitation of solids from a liquid is effected in a confined contact zone by passing the liquid downwardly through a rising stream of hot gas. A number of light weight spheres are confined within and freely movable throughout the zone. The upper and lower limits of the zone are defined by partitions each composed of a horizontal foraminous divider and an imperforate wall. The imperforate wall extends upwardly and outwardly from the divider and terminates at a wall defining the side limit of the zone. The velocity of the rising gas is highest as it passes through the divider and decreases upwardly therefrom. The gas causes the spheres resting on the divider to move upwardly and outwardly until the gas velocity is no longer capable of keeping the spheres in suspension whereupon the spheres fall downwardly along the side wall and imperforate wall scouring solids precipitated thereon.

6 Claims, 6 Drawing Figures

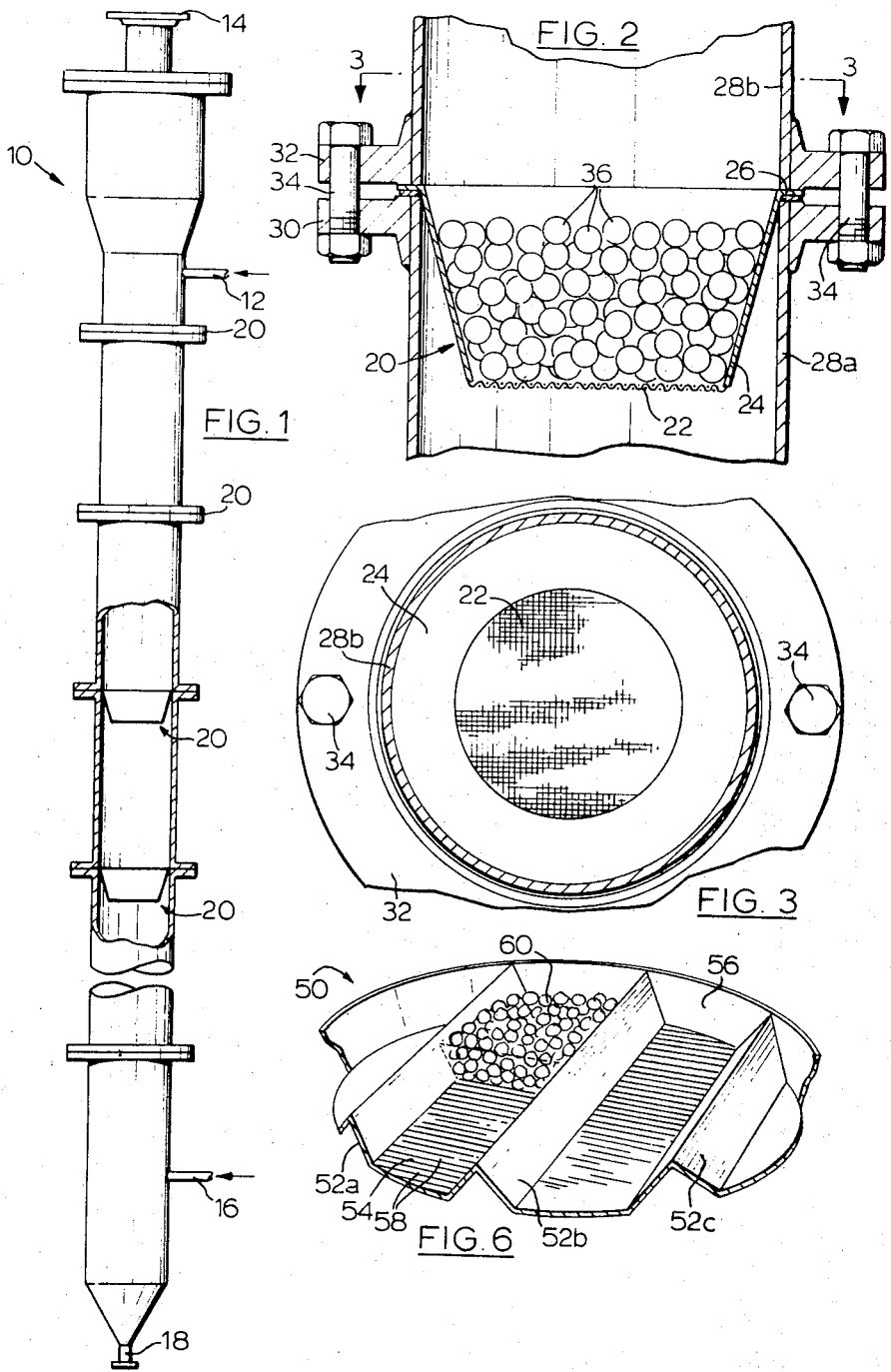

APPARATUS FOR CONTACT BETWEEN FLUIDS

This invention relates to a method and apparatus for establishing intimate contact between fluids and more particularly to a method and apparatus for effecting contact between a gas and liquid passing counter-currently through a contact zone in order to cause precipitation of solids from the liquid.

In commercial operation in which a liquid is heated to distil off volatile components in order to cause precipitation of solids, the heating medium is frequently a gas. The liquid is heated by the gas in batch precipitators which consist of tanks through which the liquid and gas pass. Agitators are usually provided to keep the liquids in motion. After the reaction is complete, the resulting slurry is removed from the tanks and is processed for the separation of the solid precipitate.

The use of batch precipitators is subject to a number of disadvantages. The solids which precipitate from solution frequently impair the performance of the precipitator. Many such solids have a tendency to adhere to the inside surfaces of the precipitator. The solids will quickly build-up on the side walls and agitators of the precipitator necessitating periodic shut down and cleaning of the apparatus. Moreover, the precipitation of solids cannot be carried out on a continuous basis using a single precipitator. After the reaction between the liquid and gas is complete, the apparatus must be shut down to permit the liquid and solids to be removed.

In recent years, use has been made of elongated columns or towers for establishing contact between liquids and gases. Such apparatus has the important advantages of permitting the gas-liquid contact to occur continuously. In operation, liquid is introduced as a stream near the top of the tower while the gas is simultaneously introduced into the bottom part of the tower. The liquid is allowed to fall within the tower and the gas travels upwardly and counter-currently to the descending liquid.

The problems caused by solids which precipitate from liquids passing through the towers described above are as serious as those caused by solids formed in batch precipitators. Vapours flowing upwardly through the towers whip counter-currently flowing liquids towards the interior wall of the tower and cause the liquid to flow downwardly along the interior wall. As a result of this so-called "wall-effect," the solids precipitating from solution tend to coat the wall. These solids seriously impair the performance of the tower. If no steps are taken to remove these solids the solids coating will increase in thickness and eventually bridge across the opening thereby blocking further flow of fluid and gas through the tower. Measures must be taken to remove the caked precipitate before the tower will again operate satisfactorily. The precipitate is customarily removed by shutting off the liquid and gas inlet valves, opening the tower to expose the compartments and cleaning the compartments using solvents or by other means. The cleaning operation is time-consuming and causes costly disruptions not only in the operation of the tower but in other operations dependent upon a continuous flow of liquid through the tower.

It is an object of the present invention to provide an apparatus for precipitating dissolved constituents from liquids having provision for continuous self-cleaning precipitated solids.

A further object of the invention is to provide a method by which solids may be continuously precipitated from solutions in a confined contacting zone and continuously removed from the zone.

The apparatus capable of accomplishing the above objects comprises a container having a vertically extending wall, an upper inlet port for the supply of liquid, an upper outlet port for the withdrawal of gas, a lower inlet port for the supply of gas and a lower outlet port for the withdrawal of liquid and precipitated solids; a plurality of vertically spaced partitions defining upper and lower limits of gas-liquid contact zones within the container, each such partition consisting of a substantially horizontal foraminous divider and at least one imperforate wall element sloping upwardly from the divider and defining in the lower portion of each contact zone layers of increasing cross sectional area in an upward direction from the partition such that the velocity of gas passing through the container will be highest passing through each divider and will decrease upwardly therefrom; and a plurality of light weight spheres confined within and movable freely throughout each contacting zone, the spheres being caused to move predominantly in an upward path from the divider of each zone by gas travelling at high velocity therethrough and then to follow a downward and outward path along the zone interior wall and sloping imperforate wall by virtue of decreasing gas velocity upwardly of the divider whereby the spheres serve to scour precipitated solids from walls contacted thereby.

According to the method of the invention, mutual contact of gas and liquid in counter-current flow in order to cause the precipitation of solids from the liquid is accomplished by establishing upward flow of gas and downward flow of liquid through a confined gas-liquid contacting zone having a side limit defined by an interior wall and upper and lower limits defined by foraminous dividers, maintaining in the zone a plurality of light weight spheres movable freely throughout the zone and adjusting the velocity of gas stream such that the velocity is highest as the gas passes upwardly through each foraminous divider and the velocity decreases upwardly therefrom and thereby lifts any spheres in contact with the divider and carries the spheres predominantly upwardly until the gas stream velocity is no longer sufficient to lift the spheres whereupon the lifted spheres move downwardly and outwardly thereby scouring precipitated solids from the interior wall.

Various features of the preferred embodiments of the invention are illustrated in the accompanying drawings in which:

FIG. 1 is an elevation of the apparatus according to the invention partly cut away to expose two internal partitions;

FIG. 2 is a somewhat schematic vertical section of a portion of the apparatus;

FIG. 3 is a plan view on line 3—3 of FIG. 2;

FIG. 5 and FIG. 6 (at the lower right hand corner of the first page of drawings) are perspective views of partitions according to second and third embodiments of the invention.

Like reference characters refer to like parts throughout the description of the drawings.

Figure 4:
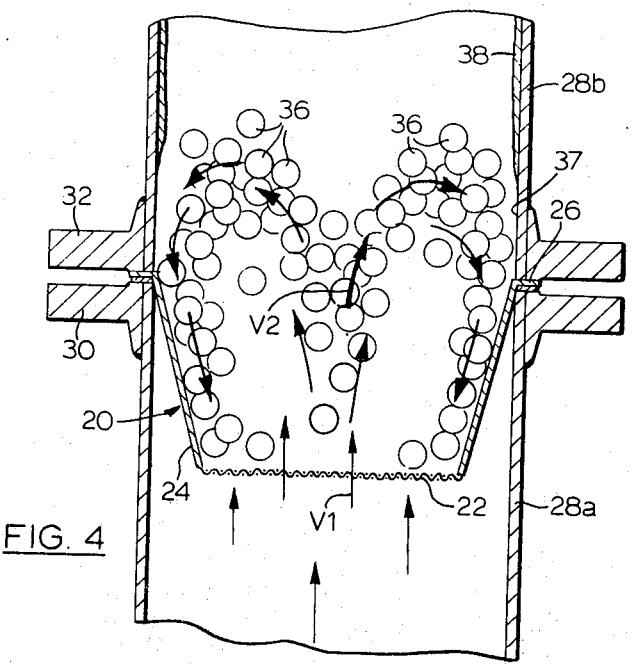
FIG. 4 is another vertical section, partly schematic, showing the apparatus in operation.

With reference to FIG. 1, the apparatus consists of a hollow cylindrical tower 10 of a known type suitable for passing liquids therethrough in counter-current flow to gases. At the upper end of the tower an inlet 12 is provided for the admission of liquid and at the top, an exit port 14 for the discharge of gas. At the lower end of the tower, an inlet 16 is provided for the admission of gas and at the bottom, a port 18 through which precipitated solids and liquids are discharged. A number of vertically spaced partitions 20 are positioned in the intermediate portion of the tower.

Feed liquid is introduced through upper inlet 12 and travels downwardly and counter-currently to a stream of gas introduced through lower inlet 16. As the liquid travels downwardly, the rising gas stream contacts and heats the liquid causing gases to evolve and solids to precipitate therefrom. Liquid together with precipitated solids discharge through outlet 18 at the bottom of the tower and vapour comprising gases introduced at lower inlet 16 and gases evolved from contact of the liquid feed with the rising gas stream are discharged through vapour outlet 14 at the top of the tower.

With reference to FIG. 2 and 3, the illustrated partition 20 includes a lower foraminous divider 22 disposed horizontally within the chamber and a solid imperforate frustoconical wall 24 which extends upwardly and outwardly from the divider and terminates at an outwardly turned circular edge 26 sandwiched between lower and upper sections 28a and 28b of the tower. Annular flanges 30 and 32 project outwardly from the outside wall of sections 28a and 28b respectively and a number of bolts, two of which being illustrated and marked 34 pass through the flanges 30 and 32 to interconnect the sections. Access may be had to each partition by removing bolts 34 and separating the two sections which meet at the partition.

Partition 20 and the next higher partition define the lower and upper limits of a gas-liquid contacting zone. A number of light weight spheres 36 are confined within the zone and are free to travel therein. The specific gravity of the spheres must be such that the rising gas, as it passes through the dividers is capable of elevating the spheres but the gas must not be travelling at a velocity which will cause flooding of the tower. The dynamic bed of spheres provides a large surface for contact between the descending liquid and rising gas for efficient heat and mass transfer from the gas to the liquid. In addition the spheres in the manner described below serve both to scour precipitated solids from inner walls contacted by the liquid and to remove solids deposited on the spheres themselves.

FIG. 4 illustrates the direction of travel of spheres 36 when buoyed upward by a rising stream of gas. The flow of gas is constricted at each partition and may only pass through divider 22. The velocity ($v_1$) of the upward flow of gas is greatest at divider 22. As the gas rises above the divider, its velocity ($v_2$) decreases as does its carrying capacity for spheres 36.

The velocity of the gas introduced into lower inlet 16 is chosen such that the upward flow of gas as it passes through each divider is sufficient to lift any spheres resting on the divider. As the gas travels upwardly from each imperforate wall 24 its velocity must decrease sufficiently that it is no longer capable of keeping the spheres in suspension. The direction of travel of the spheres is indicated by the arrows. The large flow of gas centrally of the tower causes the spheres on the dividers to rise upwardly until the spheres reach the space above the upper edge of wall 24 at which time they travel radially outwardly and downwardly along the interior wall 37 and imperforate wall 24 and return to the divider. The arrows indicate the direction of travel of the spheres as a mass and not the path followed by individual spheres. Individual spheres will be deflected by other spheres and their paths will be erratic and unpredictable.

In general, the liquid falls straight down through each divider 22 and is not forced radially outwardly by the "wall effect" until it reaches a point somewhat below the divider. It is therefore unnecessary that the whole area of the interior tower surface between adjacent partitions be scoured by the spheres. The spheres need not be projected upward into the space where the liquid is falling directly downward from the upper partition. The rapid movement of the spheres may however splash some liquid against the upper portion of the interior wall between adjacent partitions. To inhibit build-ups of solids, it is desirable to coat this area as at 38 with material to which the precipitated solids do not readily adhere. A preferred coating material is polypropylene since precipitated solids adhere only slightly to such material and can be readily removed by simple methods. For example, where basic nickel carbonates are precipitated from an aqueous ammoniacal ammonium carbonate solution passing through the tower, nickel carbonates precipitated on surface coated with polypropylene can frequently be removed from the surface by simply washing the tower with water at a somewhat lower temperature than the ammonium carbonate solution normally passing through the tower.

The spheres effectively prevent precipitate from building up on the interior wall 37 and the frustoconical wall 24 but are not as effective in preventing build-up of precipitate on divider 22. Since any part of the foraminous divider serves as a surface upon which precipitate can form, the surface area of the elements making up the divider should be as small as possible. Preferably therefore, the divider opening should be no smaller than that necessary to prevent the spheres from falling through the divider.

Figure 5:
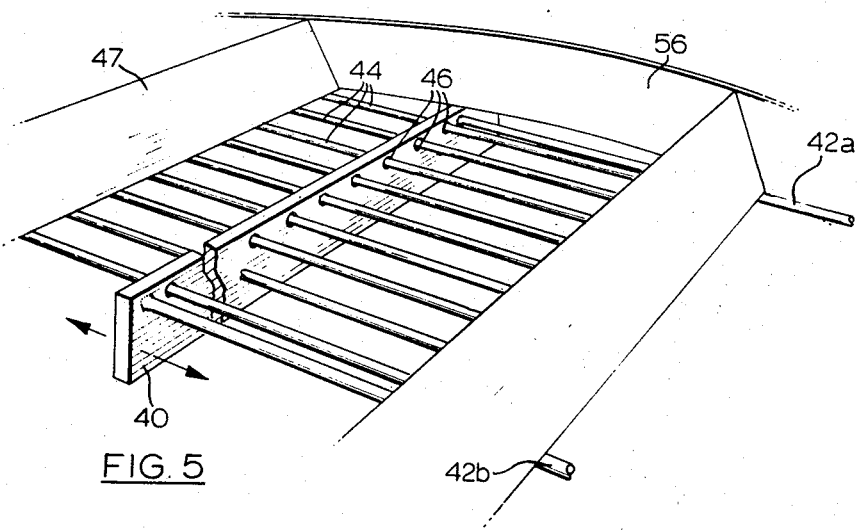

In cases where exceptionally sticky solids are precipitated from solution it may also be necessary to remove solids from the divider by other means. An apparatus which is found to be particularly suitable for this purpose is illustrated in FIG. 5. The apparatus is composed of a bar 40 connected to handle 42a and 42b. The bar together with spaced parallel rods 44 make up the foraminous divider of each partition. Bar 40 is formed with apertures 46 slightly larger than the cross-sectional area of rods 44. The rods pass through these apertures and are disposed at right angles to the bar. The rods are fastened beneath the lower edge of imperforate wall 47. Adjacent rods are disposed sufficiently closely to one another to prevent spheres from passing therebetween.

Bar 40 may be moved along rods 44 manually from outside the tower by means of handles 42 which extend outwardly through the tower wall. As the bar moves along the rods, solids deposited on the rods will be scraped away. Thus, build-up of solids on the divider can be eliminated by sliding bar 40 across the rods.

The slope of walls 24 (FIGS. 2, 3 and 4) and wall 47 (FIG. 5) should be sufficient to ensure that the spheres impinging on the walls prevent the build-up of precipitate. The slope depends on the material being treated and is determined experimentally but usually the angle between the wall and horizontal is within the range of from 35° to 50°.

Satisfactory operation of the tower is dependent upon a number of factors. The slope of the imperforate wall of each partition must be such that the gas passing upwardly thereby causes the spheres to move predominantly in the required direction. The depth of spheres on each divider is important to satisfactory operation of the tower as is the diameter and specific gravity of the spheres. These factors vary according to the material being treated, the dimensions of the tower and operating conditions. Experiments are necessary to determine the conditions which result in satisfactory operation of the tower. For some applications, the partition illustrated in FIGS. 2 to 4 is suitable only in towers having a comparatively small internal diameter, generally 2 feet or less. In such applications the partition illustrated in FIG. 6 may be suitable for towers having larger internal diameters.

The partition illustrated in FIG. 6 designated generally 50, is made of a number of imperforate V-shaped ribs 52a, 52b and 52c disposed parallel to one another. The ribs open downwardly and are connected at their lower edges to a foraminous divider 54 which extends across the interior wall of the tower. An outer frusto-conical wall 56 extends upwardly and radially outwardly to join with the interior wall of the tower. The divider is preferably composed of a number of thin parallel rods 58 spaced sufficiently closely together to prevent spheres 60 from passing therethrough. It will be understood that partition 50 may be used within a tower of any internal diameter and by suitable choice of the number of ribs incorporated into the partition, the requirements discussed above will be satisfied. It should be noted, however, that sticky solids tend to adhere to ribs 52 and blockage at the partition will occur unless the tower is regularly shut down and the partition is cleaned. In cases where it is inconvenient to do so, partition 50 may not be suitable.

It is unnecessary that the tower of the invention have a circular internal cross-section. The cross-section may be rectangular or may be other shapes.

The operation of the tower is described with reference to the precipitation and separation of solids from a specific solution namely an aqueous ammoniacal ammonium carbonate solution containing dissolved nickel values in the form of basic nickel carbonates. The tower is packed with a number of polypropylene hollow spheres. Solution is fed into the upper zone of the tower and steam is injected into the lower zone. The condition of the stream is adjusted to maintain the spheres either in a so-called "spouting state" or in a "jumping state." "Spouting" occurs when the spheres change their position in the dynamic bed but do not jump above the bed level whereas "jumping" occurs when the spheres change their position in a dynamic bed with such force that some spheres jump one inch or more over the bed level.

In the upper zone of the tower, ammonia and carbon dioxide are desorbed and no precipitation of nickel carbonate occurs. The spheres, partitions and column walls remain quite clean without extensive scaling. In the intermediate zone of the tower heavy precipitation and scaling of nickel carbonate occurs. In addition, large amounts of foam are produced above each partition. Movement of the spheres effectively prevents build-up of scale on the interior tower walls as well as the imperforate portions of the dividers.

The solution passing through the lower zone of the tower contains only minor amounts of ammonia and carbon dioxide and substantially all these volatile components come out of solution in this zone. The spheres do not move as widely in this zone as they do in the intermediate zone.

The gas should be travelling at sufficient velocity to keep the spheres in motion in the lower zone in which the spheres tend to move only slightly and in the intermediate zone in which there is a large build-up of foam which resists movement of the spheres. The gas velocity is determined experimentally for each zone. For best performance of the column, the gas velocity is only slightly less than its flooding velocity.

Feed temperature has a marked effect on the boundaries between adjacent zones. For example, a roughly 25° F. decrease from the standard feed temperature of 175° F. shifts the boundary between the upper and intermediate zones one partition down. Thus adjustment of conditions in the three zones can be achieved, in part by varying the temperature of the solution at the feed inlet.

What we claim as new and desire to protect by Letters Patent of the United States is:

1. A container having a vertically extending interior wall, an upper inlet port for the supply of liquid, an upper outlet port for the withdrawal of gas, a lower inlet port for the supply of gas and a lower outlet port for the withdrawal of liquid and precipitated solids; a plurality of vertically spaced partitions defining upper and lower limits of gas-liquid contact zones within the container, each such partition consisting of a substantially horizontal foraminous divider and at least one imperforate wall element sloping upwardly from the divider and defining in the lower portion of each contact zone layers of increasing, cross-sectional area in an upward direction from the partition such that the velocity of gas passing through the container will be highest passing through each divider and will decrease upwardly therefrom; and a plurality of light weight spheres confined within and freely movable throughout each contacting zone, the spheres being caused to move predominantly in an upward path from the divider of each zone by gas travelling at high velocity therethrough and then to follow a downward and outward path along the zone interior wall and sloping imperforate wall element by virtue of decreasing gas velocity upwardly of the divider whereby the spheres serve to scour precipitated solids from walls contacted thereby.

2. The apparatus as claimed in claim 1 wherein said imperforate wall element is frusto-conical in shape commencing at said foraminous divider opening upwardly and outwardly and terminating at said side wall.

3. The apparatus as claimed in claim 1 wherein at least one V-shaped rib is positioned above each said foraminous divider and extends across the cross-section of said container, said rib closing upwardly and terminating at a peak.

4. The apparatus as claimed in claim 1 wherein said foraminous divider is composed of a plurality of fixed spaced parallel rods and a bar disposed normal to said rods and having spaced apertures through which freely pass said rods whereby said bar may be moved along said rods and when so moved, said bar removes solids deposited on said rods.

5. The apparatus as claimed in claim 4 further including a handle connected to said bar and extending outwardly of said container whereby removal of solids deposited on said rods may be accomplished by manipulation of said handle from outside said container.

6. The apparatus as claimed in claim 1 wherein the areas of said interior wall defining the side limits of each contact zone are coated with polypropylene.

* * * * *